May 27, 1958 — H. YARWOOD — 2,835,964
MANIPULATORS FOR SUPPORTING WORK FOR
WELDING OR OTHER OPERATIONS
Filed July 27, 1956 — 3 Sheets-Sheet 1

Inventor
HENRY YARWOOD

May 27, 1958     H. YARWOOD     2,835,964
MANIPULATORS FOR SUPPORTING WORK FOR
WELDING OR OTHER OPERATIONS
Filed July 27, 1956     3 Sheets-Sheet 3

Inventor
HENRY YARWOOD

By

Attorney

United States Patent Office 2,835,964
Patented May 27, 1958

2,835,964

MANIPULATORS FOR SUPPORTING WORK FOR WELDING OR OTHER OPERATIONS

Henry Yarwood, Durham, England, assignor to Fusarc Limited, a British company

Application July 27, 1956, Serial No. 600,578

2 Claims. (Cl. 29—288)

The present invention relates to manipulators for supporting work for welding or other operations, in which provision is made for raising or lowering as well as for tilting the support for the work so as to facilitate the performance of the welding or other operation. Provision may also be made for rotating the support for the work.

According to the present invention, in a manipulator for supporting work during the performance of welding or other operations, provision is made for raising or lowering and also for tilting the support for the work and means is provided for coupling the support to a common motor for raising and simultaneously tilting the work support.

We have found that the number of motors required, and hence the cost of the manipulator, can be reduced by arranging that the raising and tilting movements are effected simultaneously under the control of a common electric motor. To utilize such an arrangement to the best advantage, we prefer that the manipulator should be so designed that there is little upward or downward movement of the centre of gravity of the load carried by the manipulator during raising or lowering and tilting. The load carried by the manipulator is the combination of the work support and the work mounted thereon. It is appreciated that the position of the centre of gravity of this load will vary according to the dimensions and weight of the work amounted on the work support, but nevertheless by assuming typical dimensions and weight of the work it is possible to arrive at a compromise arrangement in which over the range of work to be handled by the manipulator the upward and downward movement of the centre of gravity of the load is quite small.

The support for the work may take the form of a table provided with slots or other apertures to receive bolts or other means for securing the work to the work support. In addition to the raising or lowering and tilting movements of the work support, provision may be made for turning the work support about a further axis, for example, perpendicular to the axis of tilt, either manually or by a further motor.

One form of construction in accordance with the present invention will now be described by way of example with reference to the accompanying drawings. In the drawings.

Figure 1:
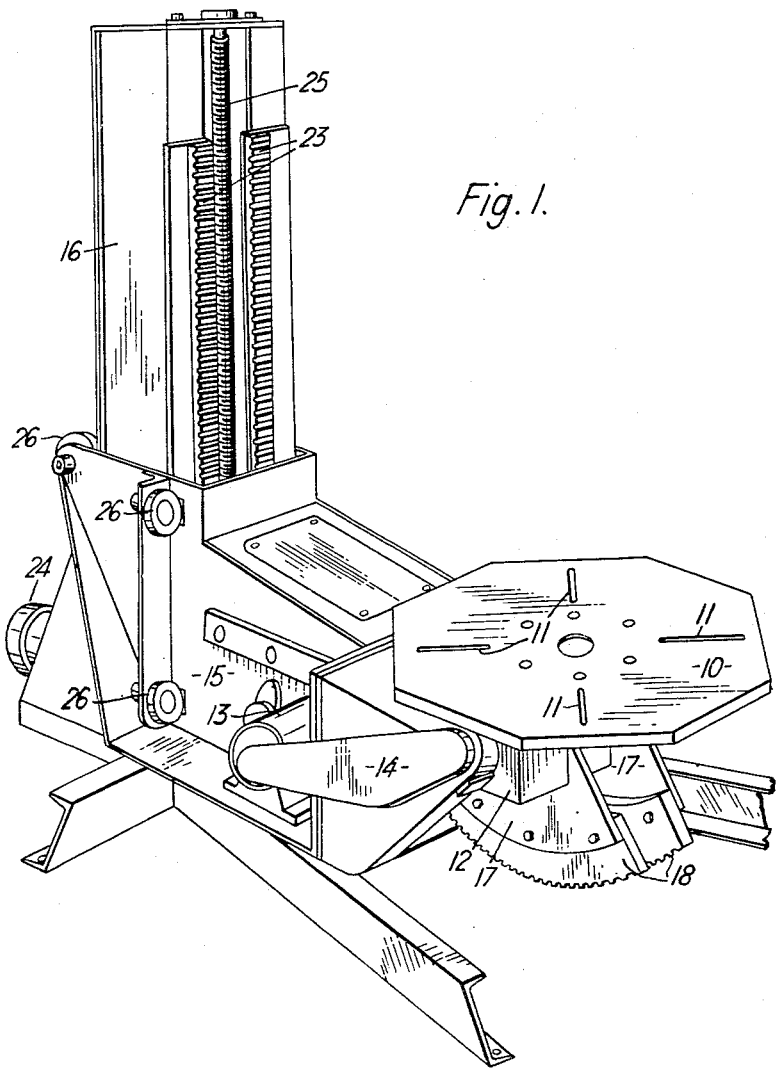
Figure 1 is a perspective view showing a manipulator table in its lowest position.

Referring to the drawings; a manipulator for holding work to be welded has a table 10 with radial slots 11 to receive bolts by which work can be secured to the table.

The table 10 is rotatable about its axis of symmetry perpendicular to the plane of the table, being supported by bearings in a tiltable housing 12. A motor 13 is provided for rotating the table about its axis, the drive being taken through a belt or chain in a casing 14, and thence through gearing within the housing 12 to the turntable 10. The tiltable housing 12 is carried by trunnions at the end of cantilever carrier 15 moveable up and down a vertical column 16. The tiltable housing 12 has secured to it two arcuate plates 17 carrying gear quadrants 18. The gear quadrants 18 are arranged to mesh with a gear train comprising gear wheels 20, 21 and 22, indicated diagrammatically in Figure 2 and housed within the cantilever carrier 15. The gear wheel 22 is arranged to mesh with two vertical racks 23 carried by the vertical column 16. Raising and lowering of the cantilever carrier 15 is effected by a motor 24, which is coupled through gearing (not shown) to a leadscrew 25 which extends the full height of the column 16. Wheels 26 are provided on the cantilever carrier 15 and are arranged to run on machined tracks provided for this purpose on the column 16 to reduce friction between the cantilever carrier and the column during relative movement.

Figure 2:
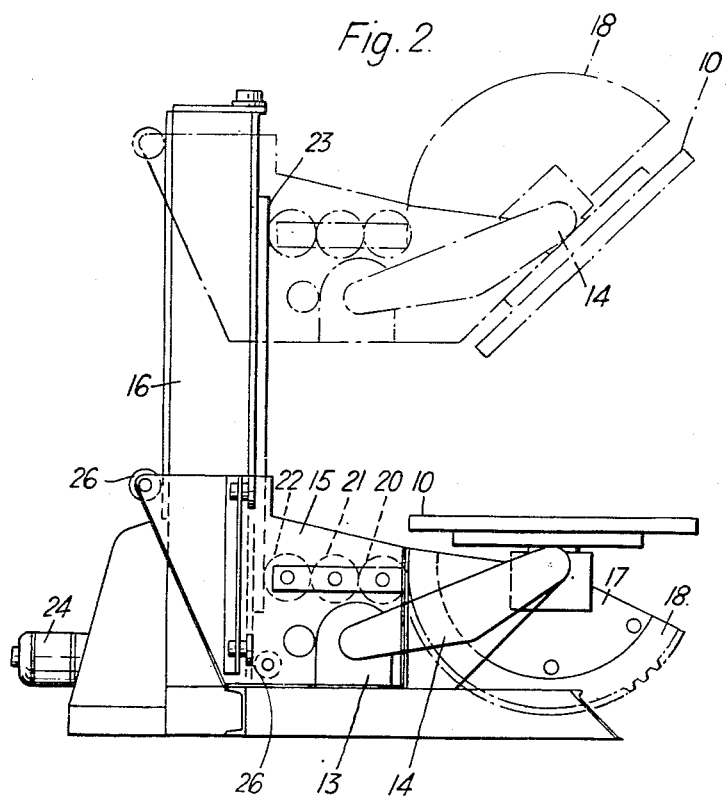
Figure 2 is a diagrammatic side elevation showing in full lines the manipulator table in its lowest position, and in dotted lines the manipulator table in its highest position.
Figure 3:
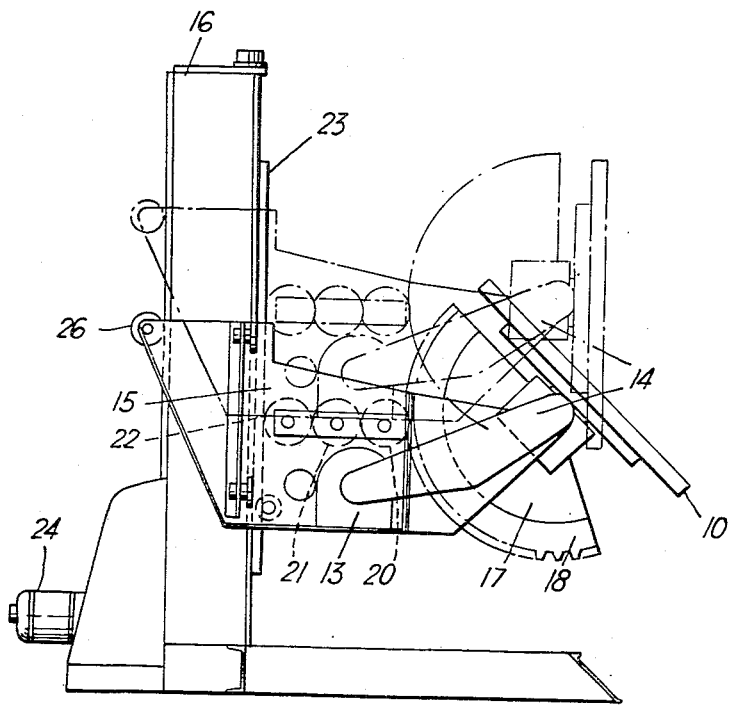
Figure 3 is a diagrammatic side elevation showing the manipulator table in two intermediate positions. In the position shown in full lines the table is inclined at an angle of approximately 45° to the horizontal, while in the position shown in dotted lines the plane of the table is vertical.

The arrangement of the gear quadrant 18, gear train 20, 21, 22 and rack 23 is such that as the cantilever carrier 15 is raised from its lowermost position the table 10 is progressively tilted from a generally horizontal position shown in Figure 1, and in full lines in Figure 2, through the intermediate positions shown in Figure 3 to the extreme position shown in dotted lines in Figure 2. The arrangement of the manipulator is such that, when the cantilever carrier has been moved through about one third of its upward travel, the table 10 lies at an angle of approximately 45°. When the cantilever carrier has been raised through about two thirds of its travel the plane of the table is approximately vertical. Further travel of the cantilever carrier to its extreme upper limit causes the table to tilt further to a position in which it over hangs, and is tilted downwardly at an angle of about 45°.

The dimensions of the manipulator and the gear train coupling the table tilting quadrant of the table tilting rack are selected so that the combined effects of the raising and tilting upon the centre of gravity of the load, that is to say, the table and the work carried thereby, is quite small. In consequence, the power required from the electric motor is substantially less than would be required if the raising and the tilting of the table were effected independently by means of separate electric motors.

I claim:

1. A manipulator for supporting work during the performance of welding or other operations, comprising a base, a pillar on said base, a carrier vertically movable on said pillar, a work support mounted on said carrier for tilting movement about a substantially horizontal axis, a motor operatively coupled to said carrier to cause vertical movement of said carrier on said pillar, and means coupling said work support to said motor to cause simultaneous tilting of said work support during vertical movement of said carrier, said tilting being in a sense tending to reduce vertical movement of the centre of gravity of said work support and work mounted thereon during raising of said work support.

2. A manipulator for supporting work during the performance of welding or other operations, comprising a base, a pillar mounted on said base, a carrier movable vertically on said pillar, a motor operatively coupled to said carrier to cause vertical movement of the carrier on said pillar, a work support mounted on said carrier for tilting movement about a horizontal axis, a rack on said pillar, and gear means coupling said rack to said work support to cause tilting of said work support when said carrier is moved vertically on said pillar, said tilting being in a sense tending to reduce vertical movement of the centre of gravity of said work support and work mounted thereon during raising of said work support.

References Cited in the file of this patent

UNITED STATES PATENTS

| | | |
|---|---|---|
| 2,318,791 | Mueller | May 11, 1943 |
| 2,469,644 | Harrison | May 10, 1949 |
| 2,477,169 | Brekelbaum | July 26, 1949 |
| 2,488,296 | Kraus | Nov. 15, 1949 |
| 2,495,438 | Bentley et al. | Jan. 24, 1950 |
| 2,729,883 | Hilkemeier | Jan. 10, 1956 |
| 2,763,053 | Anderson | Sept. 18, 1956 |